Figures 1, 2, 3, 4:
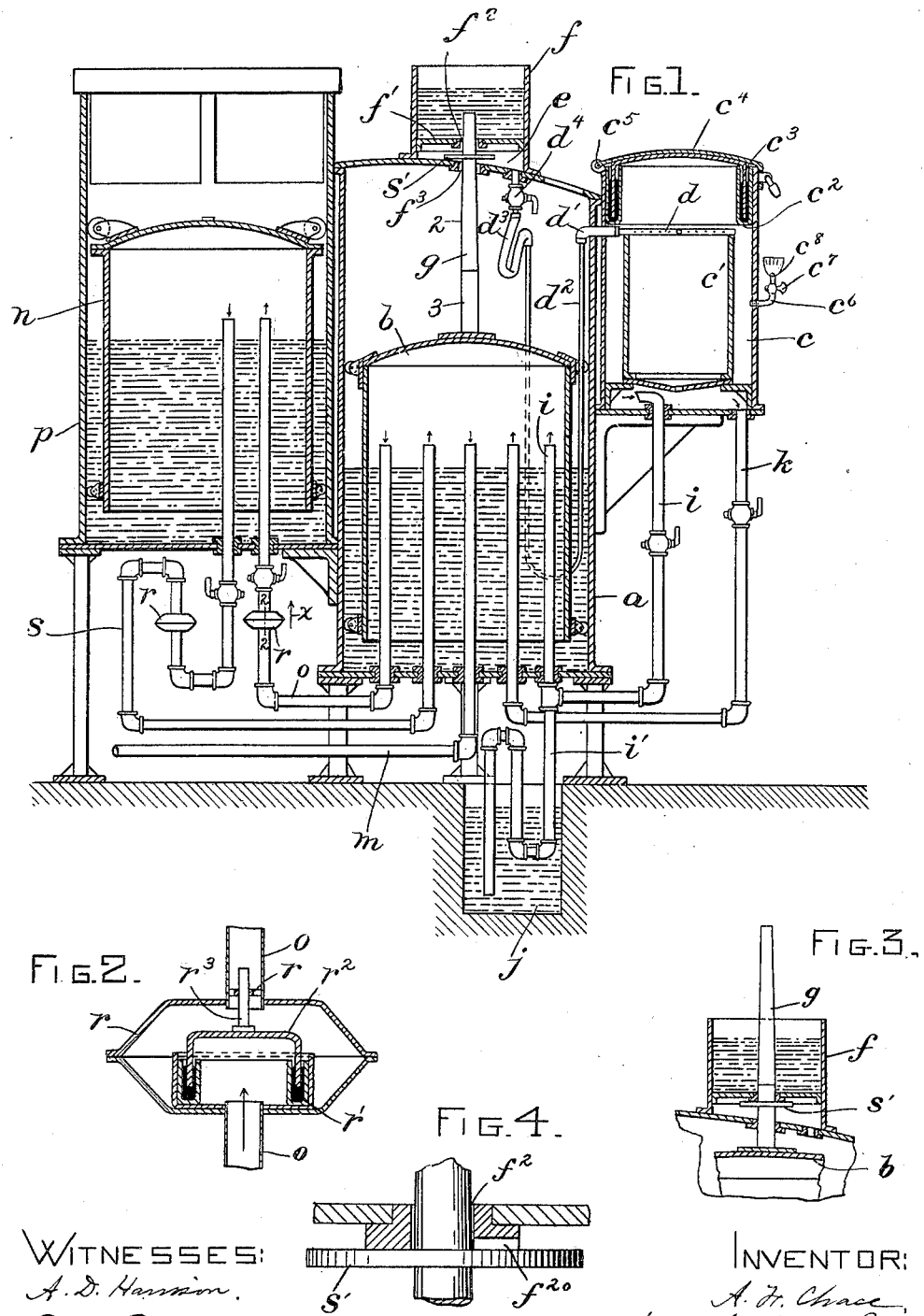

No. 649,811. Patented May 15, 1900.
A. F. CHACE.
ACETYLENE GAS GENERATING APPARATUS.
(Application filed Dec. 17, 1896.)
(No Model.)

WITNESSES:
INVENTOR:
A. F. Chace

UNITED STATES PATENT OFFICE.

ALBERT F. CHACE, OF BOSTON, MASSACHUSETTS, ASSIGNOR TO THE CHACE CARBIDE AND GAS GENERATOR COMPANY, OF MAINE.

ACETYLENE-GAS-GENERATING APPARATUS.

SPECIFICATION forming part of Letters Patent No. 649,811, dated May 15, 1900.

Application filed December 17, 1896. Serial No. 616,060. (No model.)

*To all whom it may concern:*

Be it known that I, ALBERT F. CHACE, of Boston, in the county of Suffolk and State of Massachusetts, have invented certain new and useful Improvements in Gas-Generating Apparatus, of which the following is a specification.

This invention relates to apparatus for generating acetylene gas by the reaction of water upon calcic carbid; and it has for its object to provide a simple and efficient apparatus for economically and safely generating and storing acetylene gas in such quantities as may be demanded by the consumer.

The invention consists in the improvements which I will now proceed to describe and claim.

Of the accompanying drawings, forming a part of this specification, Figure 1 represents a sectional elevation of an apparatus embodying my invention. Fig. 2 represents a section on line 2 2 of Fig. 1. Fig. 3 represents a sectional view of a portion of the apparatus, showing the floating gas-reservoir raised to shut off the water. Fig. 4 represents a partial side elevation and partial sectional view of certain details hereinafter referred to.

The same letters and numerals of reference indicate the same parts in all the figures.

In the drawings, $a$ represents a water-tight casing or chamber containing an inverted floating gas-reservoir $b$, which floats in a body of liquid contained in the casing $a$.

$c$ represents a generating-chamber containing a receptacle $c'$ for calcic carbid and provided above said receptacle with a water-spraying pipe $d$, adapted to supply water to the carbid. The pipe $d$ is supplied through a pipe $d'$, passing through one side of the chamber $c$ and through the adjacent wall of the casing $a$, said pipe being connected by a loop or U-shaped pipe $d^2$ with a flexible section $d^3$, which is connected by a valved section $d^4$ with a water-supply chamber $e$, hereinafter referred to. The generating-chamber $c$ is provided at its upper portion with an annular trough $c^2$, which contains a body of mercury or other suitable sealing material receiving a flange $c^3$ on a cover $c^4$, which is hinged at $c^5$ to the upper portion of the chamber $c$. The cover $c^4$ enables the chamber to be readily opened, while the trough $c^2$, flange $c^3$, and mercury seal form a tight joint, preventing the leakage of gas.

$c^6$ represents a gas-escape pipe connected with the chamber $c$ and equipped with a cock $c^7$ and a burner-tip $c^8$, the object being to enable the gas remaining in the chamber $c$ to be disposed of before opening the chamber to renew the supply of carbid.

$f$ represents a water-tank which is located above the chamber $e$ and is here shown as supported by the top of the casing $a$. The said tank has a bottom $f'$, which forms the top of the chamber $e$, and has an outlet $f^2$, through which water flows into the chamber $e$. The bottom of the chamber $e$ is inclined and has an opening $f^3$ in line with the opening $f^2$, the lower portion of said bottom receiving the valved pipe connection $d^4$, so that water flowing into the chamber $e$ will flow down the inclined bottom to the pipe connection $d^4$ and will flow from thence to the generating-chamber.

$g$ represents a valve which is affixed to the gas-reservoir $b$ and is formed as a vertical rod or spindle projecting into the openings $f^3$ and $f^2$. The upper portion 2 of said valve is tapering and is of such size that when any part of it is in the opening $f^2$ it does not close said opening, but permits water to flow from the reservoir $f$ to the chamber $e$. The lower portion 3 of the valve is of uniform diameter and is formed to close the outlet $f^2$ and prevent the escape of water therefrom, so that when the reservoir $b$ is depressed, as shown in Fig. 1, the tapering portion of the valve being in the outlet $f^2$, water flows continuously to the generating-chamber; but when the gas-reservoir is raised by the pressure of gas in it to the position shown in Fig. 3, the portion 3 of the valve being in the outlet $f^2$, said outlet is closed and the flow of water ceases. It will be seen, therefore, that when the pressure of gas in the reservoir $b$ reaches or exceeds a predetermined degree the supply of water is shut off, so that the further generation of gas ceases until the pressure is reduced by withdrawal of the gas from the reservoir. Provision is made, however, for a sufficient upward movement of the gas-reservoir $b$ after the outlet $f^2$ has been closed to accommodate the gas generated by the water remaining in the chamber $e$ and in the portions of the water-conduit above the spraying device $d$, so that the limited generation of gas after the water has been shut off will not dangerously increase the pressure in the gas-reservoir. This provision is made in the present instance by the portion 3 of the valve, said portion being of sufficient length to permit the reservoir $b$ to rise sufficiently to accommodate the gas generated after the first shutting off of the water, the portion 3 fitting the outlet $f^2$ sufficiently to shut off the flow of water and being at the same time movable in said outlet. The tapering form of the portion 2 of the valve causes the valve to vary the quantity of water delivered to the generating-chamber, the quantity depending on the height of the reservoir $b$. For instance, when the reservoir is depressed or at the lowest extreme of its movement the valve permits a relatively-rapid flow of water to the generating-chamber, so that there is a correspondingly-rapid generation of gas. As the reservoir $b$ rises under the pressure of an accumulation of gas the flow of water is proportionately checked until it is entirely shut off by the portion 3 of the valve. Hence there is never an objectionable accumulation of water in the generating-chamber when the supply of water is shut off by the rise of the gas-reservoir $b$, the quantity of gas generated after the shutting off of the water-supply being therefore reduced to the minimum.

The gas generated in the chamber $c$ passes to the gas-reservoir $b$ through a pipe $i$, which extends from a point within the chamber $c$, above the bottom thereof, downwardly and upwardly through the bottom of the casing $a$ into the gas-reservoir $b$. To provide for the escape from the pipe $i$ of any water that may accumulate therein, I provide the pipe $i$ with a branch $i'$, extending downwardly into a water-tank $j$, which contains a body of water, acting as a seal for the lower end of the branch pipe $i'$, said pipe being preferably bent, as shown in Fig. 1. The pipe $i$ and its water seal $j$ also constitute a safety-valve, permitting the gas to escape from the reservoir $b$ in case of any dangerous increase of pressure therein, the water seal being adapted to prevent the escape of gas, excepting when the pressure in the holder $b$ reaches a dangerous point.

To provide for the thorough escape of any water which may accumulate in the generating-chamber $c$, either by dropping through the carbid-holder $c'$ or by the trickling down the walls of the chamber $c$ of water formed by condensation on said walls, I provide a pipe $k$, which extends from the bottom of the generating-chamber $c$ downwardly and upwardly through the bottom of the casing $a$ into the gas-reservoir $b$. The end of the pipe $k$ within the gas-holder is preferably lower than the end which communicates with the generating-chamber, so that water from said chamber will be discharged into the gas-holder.

$m$ represents a service-pipe which extends from the interior of the gas-reservoir $b$ to the bottom of the casing $a$ and supplies the gas to the burners.

$n$ represents a secondary floating gas-reservoir which is adapted to receive any excess of gas-pressure that may accumulate in the gas-reservoir $b$, which I will now term the "primary" reservoir. A pipe $o$, extending from the interior of the primary reservoir $b$ downwardly through the bottom of the casing $a$, extends upwardly through the bottom of a casing $p$, which contains the secondary reservoir $n$ and is arranged to discharge gas within the secondary reservoir. The pipe $o$ is provided with a valve adapted to yield automatically in the direction of the arrow $x$ in Fig. 1, so that when the pressure in the primary gas-reservoir exceeds the point which the said valve is adapted to resist the valve yields and permits the passage of gas through the pipe $o$ to the secondary reservoir $n$. Said valve may be constructed as shown in Fig. 2, where I show a casing $r$ connected to two sections of the pipe $o$, the lower portion of said casing containing an annular trough $r'$, which contains a body of mercury. The mercury in the trough $r'$ supports an inverted-cup-shaped valve $r^2$, which is vertically movable and has a stem $r^3$ movable in a guide $r^4$. Gas-pressure from the tank $b$ exerted against the valve $r^2$ will raise said valve, and when the pressure becomes sufficient will break the seal between it and the mercury in the trough $r'$, so that the gas will pass through the casing $r$ into the secondary reservoir $n$. The gas thus transferred from the primary reservoir to the secondary reservoir may be drawn from the latter by any suitable means. I prefer to provide means for automatically returning the gas from the secondary reservoir $n$ to the primary reservoir $b$ when the pressure in the latter shall have become sufficiently reduced. To this end I show a pipe $s$, extending from within the secondary reservoir $n$ downwardly through the bottom of the casing $p$ and upwardly through the bottom of the casing $a$ into the primary reservoir $b$. Said pipe $s$ has an automatically-opening valve similar to that shown in Fig. 2, the pipe $s$ being arranged so that said valve will be opened by pressure from within the secondary reservoir $n$. The reservoir $n$ should be weighted so that it will yield to receive gas from the reservoir $b$ when the pressure in the latter exceeds a predetermined degree and will force gas back to the reservoir $b$ through the pipe $s$ when the pressure in the reservoir $b$ falls below a predetermined degree.

I do not limit myself to the details of construction here shown and described and may variously modify the same without departing from the spirit of my invention.

$s'$ represents a diaphragm loosely mounted on the valve $g$ in the chamber $e$ and adapted to slip on the valve and at the same time hug it closely. The object of the diaphragm is to prevent the water flowing through the outlet $f^2$ from leaking through the opening $f^3$ into the casing $a$, the diaphragm constituting a roof over the opening $f^3$, deflecting the water therefrom. The valve slips up and down in the diaphragm, and in moving upwardly presses the diaphragm against the lower end of the valve-seat $f^2$. Said seat has a groove or waterway $f^{20}$, Fig. 4, which prevents the diaphragm from shutting off the flow of water through the outlet. The diaphragm may be a disk or sheet of rubber held against the valve by its own resilience, or it may be made of plates of sheet metal drawn inwardly by springs against the valve.

I claim—

1. In a gas-generator, the combination of a generating-chamber, a water-reservoir having an outlet connected with the generating-chamber, a floating gas-reservoir also connected with the generating-chamber, and a valve formed as a rod or plug extending in the direction of movement of the gas-reservoir and movable with the latter in said outlet.

2. In a gas-generator, the combination of a generating-chamber, a water-reservoir and a floating gas-reservoir both connected with the generating-chamber, and a valve formed as a rod or plug movable with the gas-reservoir in the outlet of the water-reservoir, said valve having a tapering upper portion formed to graduate the flow of water through the outlet, and an outlet closing lower portion formed to move in the outlet, whereby the gas-reservoir is permitted to rise after the closing of the outlet.

3. In a gas-generator, the combination of a generating-chamber, a floating gas-reservoir connected therewith, a water-reservoir having an outlet in its bottom, a water-chamber below the water-reservoir adapted to receive water from said outlet and connected with the generating-chamber to deliver water thereto, said chamber having an opening in its bottom coinciding with the said outlet, and a valve formed as a rod or plug movable with the gas-reservoir in the opening in the bottom of the said water-chamber and in the outlet of the water-reservoir and formed to open and close said opening by moving longitudinally therein, the said water-chamber and valve having provisions for preventing escape of water through the valve-receiving opening in the bottom of the chamber.

4. In a gas-generator, the combination of a generating-chamber, a floating gas-reservoir connected therewith, a water-reservoir having an outlet in its bottom, a supplemental chamber below the water-reservoir, having an inclined bottom provided with an opening coinciding with the reservoir-outlet, a conduit connected with the lower portion of said inclined bottom and extending to the generating-chamber, a vertical valve affixed to the gas-reservoir and entering the opening in the inclined bottom and the outlet in the bottom of the water-reservoir, said valve having a tapering upper portion, and a diaphragm loosely connected with the valve between the water-reservoir outlet and the inclined bottom, to prevent water flowing from said outlet from passing through the valve-opening in the inclined bottom.

5. In a gas-generator, the combination of a generating-chamber, a primary floating gas-reservoir connected therewith, a secondary floating gas-reservoir, a conduit connecting the two reservoirs and having a valve which yields to allow gas to pass from the primary to the secondary reservoir, and a return-conduit connecting the two reservoirs and having a valve which yields to permit the return of the gas from the secondary to the primary reservoir.

6. A gas-generator comprising a water-reservoir having an outlet or valve-seat in its bottom and a waterway extending outwardly from said outlet, a generating-chamber connected with said outlet, a floating gas-reservoir connected with the generating-chamber, a valve carried by the gas-reservoir and projecting into the outlet, and a diaphragm loosely connected with the valve below said outlet.

In testimony whereof I have signed my name to this specification, in the presence of two subscribing witnesses, this 14th day of December, A. D. 1896.

ALBERT F. CHACE.

Witnesses:
S. V. WOODRUFF,
C. F. BROWN.